(12) United States Patent
Lovestead et al.

(10) Patent No.: US 7,022,223 B2
(45) Date of Patent: Apr. 4, 2006

(54) METHODS AND SYSTEMS FOR REMOVING FLOATING SOLID WASTE FROM THE SURFACE OF A WATERCOURSE

(75) Inventors: H. Scott Lovestead, Weston, CT (US); James E. Richardson, Eliot, ME (US)

(73) Assignee: Tesomas Holdings LLC, Weston, CT (US)

( * ) Notice: Subject to any disclaimer, the term of this patent is extended or adjusted under 35 U.S.C. 154(b) by 146 days.

(21) Appl. No.: 10/436,825

(22) Filed: May 13, 2003

(65) Prior Publication Data

US 2004/0226896 A1    Nov. 18, 2004

(51) Int. Cl.
*C02F 1/40*    (2006.01)

(52) U.S. Cl. .................. 210/170; 210/173; 210/242.1; 210/258; 210/299

(58) Field of Classification Search ................ 210/169, 210/170, 242.1, 242.3, 258, 259, 299, 747, 210/776, 173
See application file for complete search history.

(56) References Cited

U.S. PATENT DOCUMENTS

| | | | | |
|---|---|---|---|---|
| 1,450,545 A | * | 4/1923 | Hans ........................... | 210/122 |
| 1,909,578 A | * | 5/1933 | Coard ..................... | 210/242.1 |
| 2,330,508 A | * | 9/1943 | McColl .................... | 210/242.3 |
| 3,303,932 A | * | 2/1967 | Hirs et al. ................ | 210/242.1 |
| 3,363,769 A | * | 1/1968 | Wilmot et al. ............ | 210/433.1 |
| 3,693,800 A | * | 9/1972 | Stanfield et al. .......... | 210/242.3 |
| 3,722,688 A | * | 3/1973 | Wirsching ................... | 210/776 |
| 3,722,689 A | * | 3/1973 | Markel et al. ............... | 210/776 |
| 3,753,496 A | * | 8/1973 | Boyd ....................... | 210/242.3 |
| 3,767,055 A | * | 10/1973 | Flatland .................... | 210/242.1 |
| 3,831,756 A | * | 8/1974 | Bhuta et al. .............. | 210/242.3 |
| 3,970,556 A | | 7/1976 | Gore ........................... | 210/83 |
| 4,024,063 A | | 5/1977 | Mori ........................... | 210/242 |
| 4,032,449 A | * | 6/1977 | De Visser et al. ........ | 210/242.1 |
| 4,040,963 A | | 8/1977 | Garrott, Jr. .................. | 210/219 |
| 4,139,470 A | * | 2/1979 | Stagemeyer et al. ........ | 210/170 |
| 4,146,482 A | * | 3/1979 | Shyu ........................ | 210/242.3 |
| 4,154,678 A | * | 5/1979 | Kole ....................... | 210/242.1 |

(Continued)

FOREIGN PATENT DOCUMENTS

DE          23 55 463         11/1973

(Continued)

OTHER PUBLICATIONS

"Skimmers and Purifalls", Webb's Water Gardens, Fallston, MD, 1999, down loaded from web site www.webbsonline.com.

(Continued)

*Primary Examiner*—Christopher Upton
(74) *Attorney, Agent, or Firm*—Gordon & Jacobson, P.C.

(57) ABSTRACT

A floating pond skimmer is coupled by a fluid conduit to a remote filter/aerating apparatus. The skimmer sucks a mixture of solids and water, grinds/chops the solids, and pumps the reduced solids and water through the conduit to the filter/aerating apparatus which separates the solids from the mixture and aerates the water from the mixture. The floating skimmer preferably includes a vortex chamber, an on-board pump with a grinding impeller, an adjustable ballast, and an anchor. The filter/aerating apparatus includes an inclined screen and a drain tray beneath the inclined screen coupled to a water discharge conduit. Optionally, an aeration pump is coupled to the discharge conduit. Also optionally, a removable solid waste hopper is located at the lower end of the inclined screen. Otherwise the solid waste simply falls into a compost pile at the bottom of the inclined screen.

29 Claims, 15 Drawing Sheets

U.S. PATENT DOCUMENTS

| | | | | |
|---|---|---|---|---|
| 4,169,050 | A | * | 9/1979 | Serfling et al. .......... 210/242.1 |
| 4,211,654 | A | | 7/1980 | Weber et al. ................ 210/104 |
| 4,301,008 | A | * | 11/1981 | Baffert et al. ............ 210/242.3 |
| 4,430,214 | A | | 2/1984 | Baker ........................ 210/169 |
| 4,681,711 | A | | 7/1987 | Eaton .......................... 261/91 |
| 4,746,424 | A | | 5/1988 | Drew .......................... 210/169 |
| 4,882,073 | A | * | 11/1989 | Griffith ...................... 210/776 |
| 5,075,014 | A | * | 12/1991 | Sullivan ..................... 210/122 |
| 5,108,591 | A | * | 4/1992 | Hagan ........................ 210/258 |
| 5,118,412 | A | * | 6/1992 | Schmidt ..................... 210/122 |
| 5,143,605 | A | * | 9/1992 | Masciarelli .............. 210/242.1 |
| 5,197,263 | A | * | 3/1993 | Midtling et al. ......... 210/242.3 |
| 5,308,510 | A | | 5/1994 | Gore ........................... 210/776 |
| 5,575,913 | A | | 11/1996 | Sharkey ...................... 210/409 |
| 5,584,991 | A | | 12/1996 | Wittstock et al. ........... 210/151 |
| 5,788,850 | A | * | 8/1998 | Tuomey ................. 210/242.1 |
| 6,277,287 | B1 | * | 8/2001 | Terrien et al. .............. 210/747 |
| 6,461,501 | B1 | * | 10/2002 | Porter ........................ 210/170 |

FOREIGN PATENT DOCUMENTS

| | | |
|---|---|---|
| JP | 59100269 | 5/1984 |
| JP | 59205856 | 10/1984 |

OTHER PUBLICATIONS

"PondSweep™ Skimmers Do-It-Better", Waterscapes Superior Water Gardens, Jacksonville, FL, downloaded from web site www.4waterscapes.com on Jul. 12, 2001.

"How to Build a Pond Skimmer" by Greg Bickal, Toddville, IA, downloaded from web site www.geocities.com on Jul. 12, 2001.

* cited by examiner

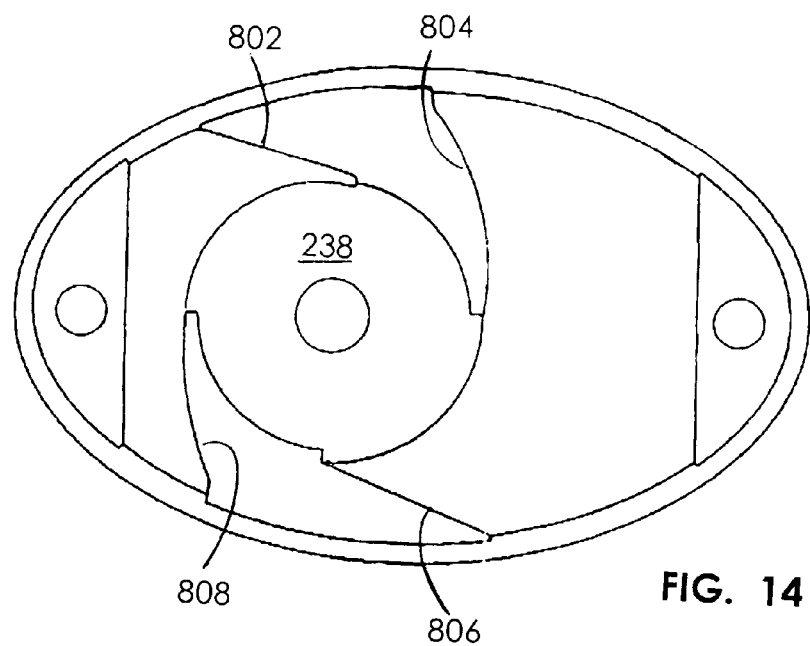
FIG. 14
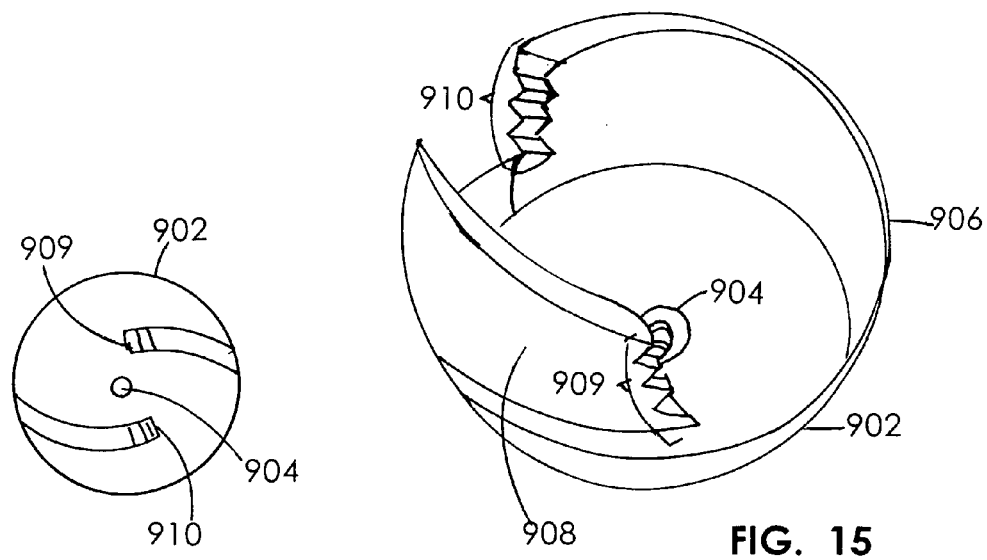
FIG. 15
FIG. 16

METHODS AND SYSTEMS FOR REMOVING FLOATING SOLID WASTE FROM THE SURFACE OF A WATERCOURSE

BACKGROUND OF THE INVENTION

1. Field of the Invention

The invention relates to skimmers for ponds and the like. More particularly, the invention relates to a combined skimmer, filter, and aeration apparatus as well as methods for its use.

2. State of the Art

Backyard ponds are very popular in many parts of the country. Ponds may vary in size from only a few square feet of surface area to one or more acres. The larger ponds are usually naturally formed whereas the smaller ponds are typically man-made. Solid waste invariably accumulates on the surface of a pond. Leaves, weeds, and other organic matter are among the most common solid waste found on the surface of ponds. In cases where the pond contains nutrients, such as fertilizers which run off surrounding land into the pond, different kinds of organic growth can live on the surface of the pond. The most common kinds of organic growth are watermeal and duck weed. In the case of small ponds, floating waste is easily removed with a hand skimmer or strainer. The larger ponds are not so easily cleaned. Eventually, the wind will blow most of the floating waste to an edge of the pond where it can be collected with hand skimmers or strainers. But the volume of waste in a larger pond calls for an automated solution.

Electrically operated pond skimmers are well known. Typical of the known pond skimmers are those sold by PondSweep Manufacturing, Co., 1204 Deer Street, Yorkville, Ill. 60560 and described in U.S. Pat. No. 5,584,991. These skimmers generally consist of an enclosure having side walls defining an internal chamber, typically two to three feet deep, which is permanently installed in a hole adjacent to the pond. A water inlet is formed near the top of the chamber adjacent to the surface of the pond water. Filter media such as various nets, screens, and/or baskets, depending on the particular model, are placed beneath the water inlet. A pump or a pump chamber is disposed beneath the filter media. The pump pumps water out of the chamber thereby causing a void which is filled by water from the surface of the pond. Debris which is floating near the water inlet is entrained by the water into the chamber and is captured by the filter media. Over time, the skimmer fills with debris and must be emptied. This involves removing the top of the enclosure and reaching down into the below ground container to remove the debris and clean the filter media. One might consider this periodic cleaning a disadvantage. However, it is generally accepted that all existing pond skimmers require some sort of periodic cleaning.

Existing pond skimmers are fixed in position and admit water and debris through a floating weir door. The floating weir door will automatically adjust for some changes in the water level of the pond. However, most natural ponds exhibit changes in water level which are beyond the range of the floating weir door. When the water level moves beyond the range of the floating weir door, the skimmer is inoperable.

It is apparent that a pond skimmer will only skim debris which is close enough to the water inlet. Depending on the size of the pond, and the prevailing winds, some debris may never reach the water inlet of the skimmer. The only solution to this problem is to install additional skimmers around the pond perimeter or to provide some way of generating a water current flowing towards the skimmer. Most people prefer the second option and this is typically accomplished with an artificial waterfall, a fountain, or a deep water aerator. Waterfalls and fountains are desirable, because, in addition to their aeration function which is good for the ecology of the pond, they are aesthetically pleasing. Waterfalls work well in man-made ponds which are designed for a waterfall and skimmer cooperation but may be impractical in natural ponds, depending on their size and shape. If a waterfall is not used, some sort of aeration device is desirable.

SUMMARY OF THE INVENTION

A system according to the present invention includes a floating pond skimmer coupled by a fluid conduit to a remote filter apparatus. Although the invention is described with reference to ponds, it is intended that the invention be applicable to any suitable watercourse including lakes and streams, etc. The floating skimmer preferably includes a vortex chamber and an on-board pump with a grinding/chopping impeller or similar apparatus for reducing solids to pieces. The filter apparatus includes an inclined screen and a drain tray beneath the inclined screen coupled to a water discharge conduit. The skimmer sucks a mixture of solids and water, reduces the solids, and pumps the reduced solids and water through the conduit to the filter apparatus which separates the solids from the mixture.

BRIEF DESCRIPTION OF THE DRAWINGS

FIG. 14 is a plan view of a skimmer unit according to the invention illustrating the water inlets;

FIG. 15 is a perspective view of an impeller;

FIG. 16 is a plan view of the impeller of FIG. 15;

DETAILED DESCRIPTION OF THE PREFERRED EMBODIMENTS

Figure 1:
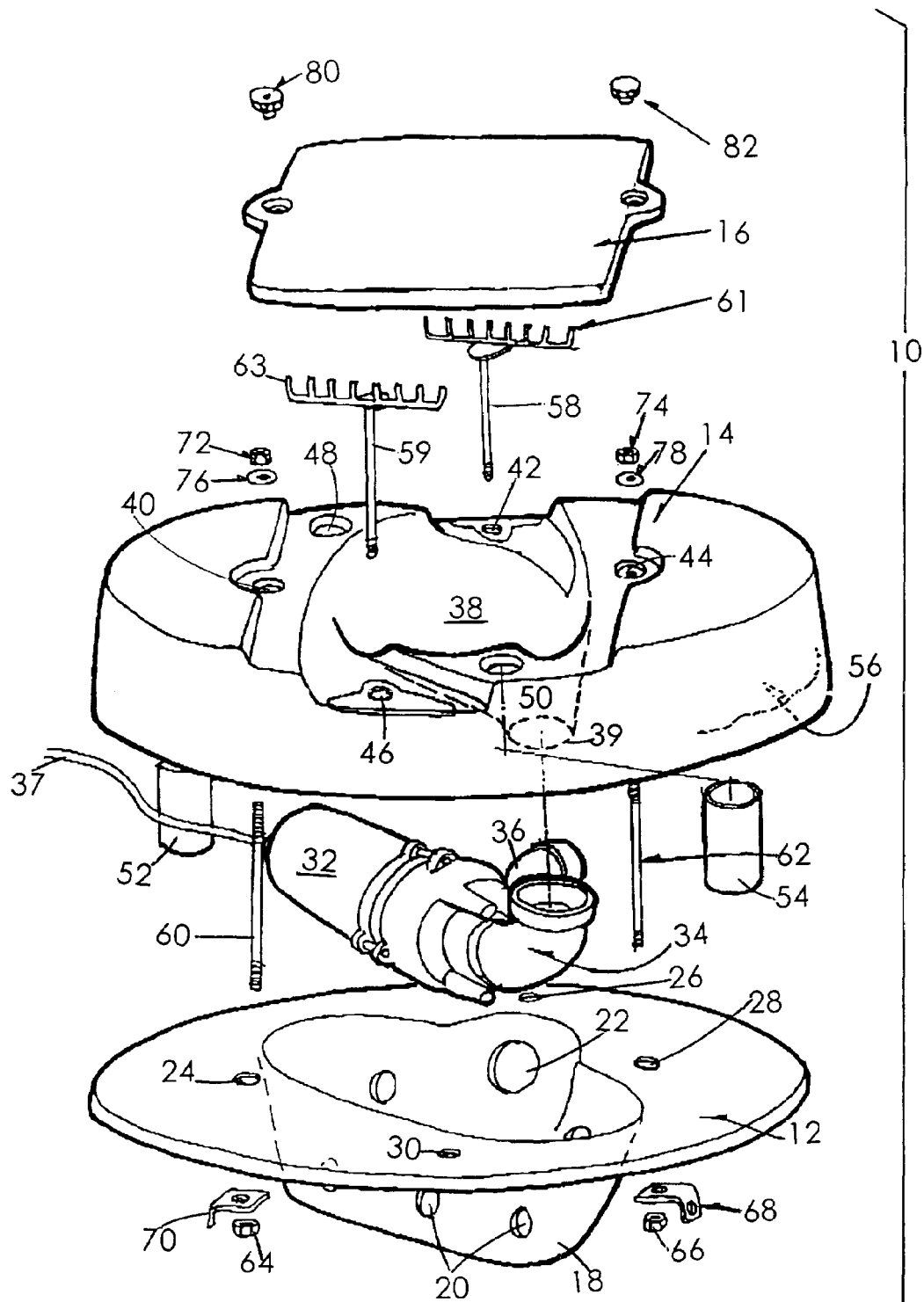
FIG. 1 is an exploded view of a first embodiment of a floating skimmer unit according to the invention.
Figure 2:
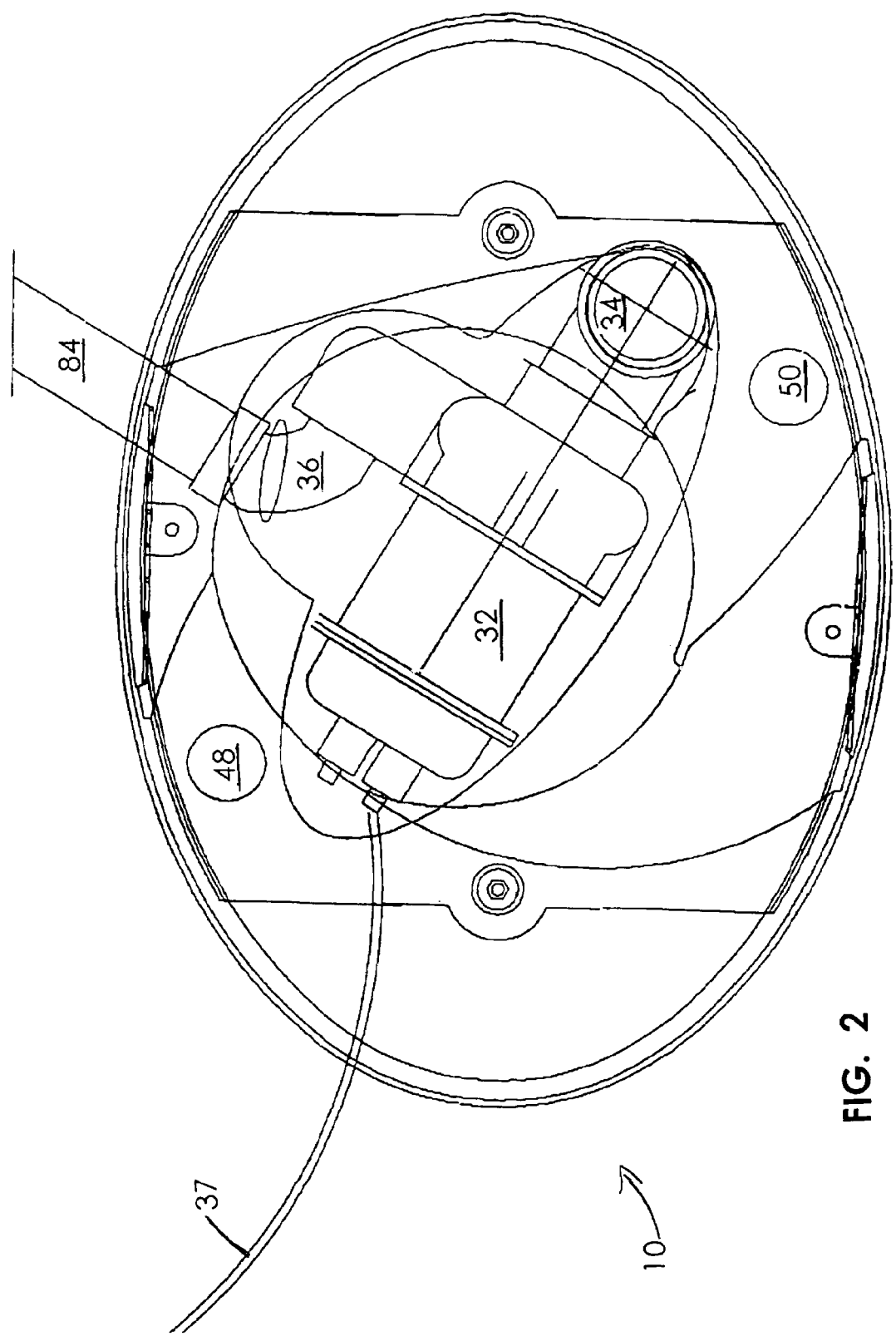
FIG. 2 is a partially transparent top view of the skimmer unit of FIG. 1.
Figure 3:
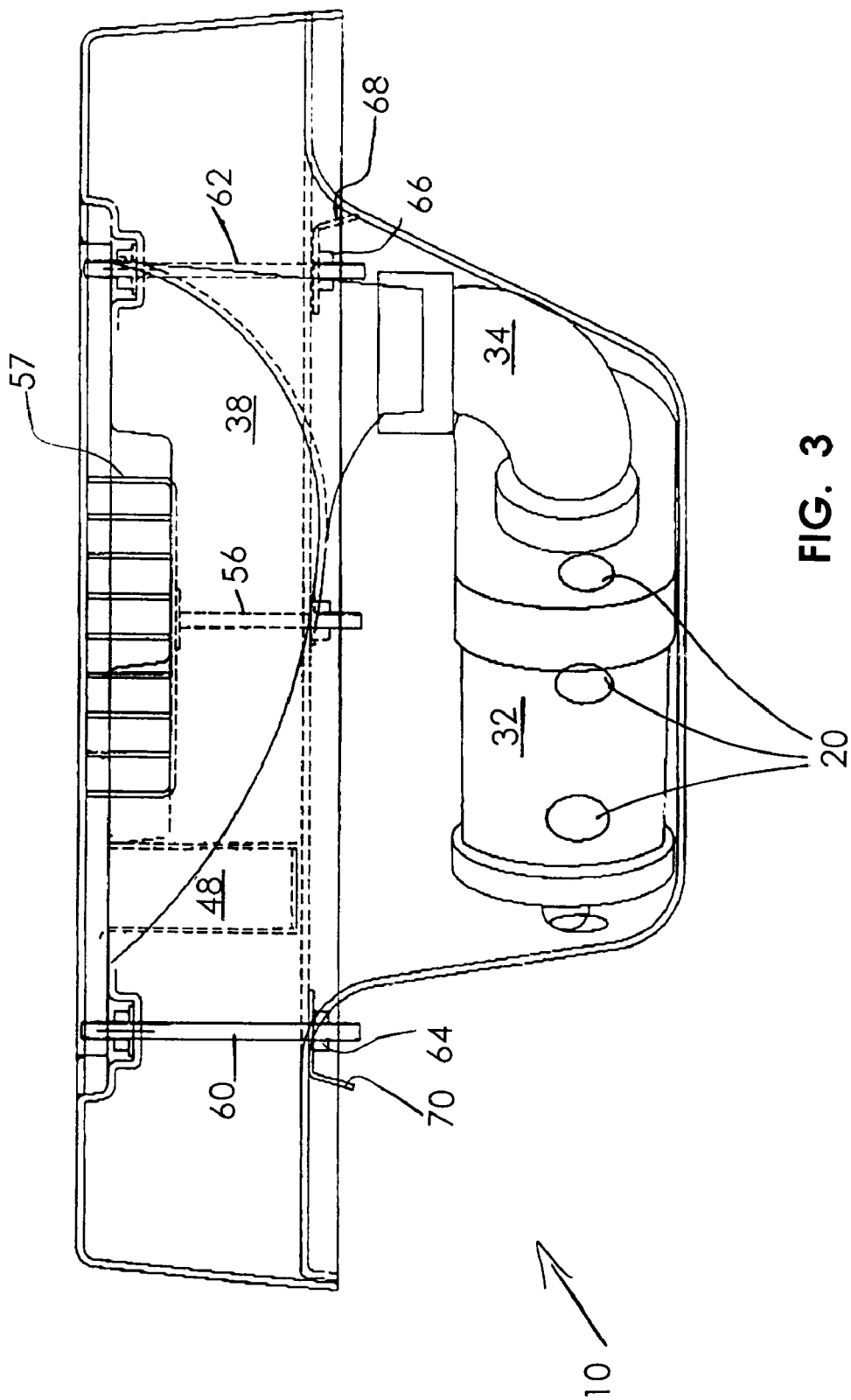
FIG. 3 is a partially transparent side elevation view of the skimmer unit of FIGS. 1 and 2.

Referring now to FIGS. 1 through 3, a floating skimmer 10 according to the invention includes a floatbody base 12, a float body 14, and a removable lid 16.

The floatbody base 12 includes a pump well 18 having cooling holes 20 and an outlet hole 22, and four mounting holes 24, 26, 28, 30. The pump well 18 is dimensioned to receive the pump 32. According to the illustrated embodiment, the pump 32 has a three inch inlet 34 and a two inch outlet 36 and a waterproof power cord 37. As mentioned above, the pump is preferably provided with a grinding or chopping impeller (not shown). A suitable pump has a capacity of approximately 4,000 to 6,000 gallons per hour.

The floatbody 14 has a central vortex chamber 38 having a lower outlet 39. The vortex chamber 38 is surrounded by four mounting holes 40, 42, 44, 46. Spaces 48, 50 on either side of the vortex chamber 38 are adapted to receive respective ballast containers 52, 54 which are held in place with poured polyurethane foam 56.

The floatbody base 12 and the floatbody 14 are coupled to each other by threaded rods 58, 59, 60, 62. The rods 58, 59 fit into holes 42, 46 26, and 30, and are provided with "combs" 61, 63 which prevent large objects (including small animals) from being sucked into the vortex chamber 38. The rods 60, 62 fit into holes 24, 28, 40, and 44. The bottoms of the rods 60, 62 are fastened to L-shaped brackets 68, 70 with nuts 64, 66. The brackets 68, 70 form anchor points for connecting the skimmer 10 to one or more anchors (not shown). The tops of the rods 60, 62 are fastened to the floatbody 14 with nuts 72, 74 and washers 76, 78. The removable lid 16 is fastened to the rods 60, 62 with threaded knobs 80, 82. As seen in FIGS. 1–3, the removable lid allows access to the adjustable ballast containers 52, 54 and the vortex chamber 38 for cleaning. The ballast containers are said to be "adjustable" because the amount of ballast contained by them can be adjusted by adding or removing ballast.

The skimmer 10 is preferably made from thermoformed ABS plastic and has overall dimensions of approximately 22 inches by approximately 32 inches by approximately 15 inches deep. The horizontal distance between the rods 60, 62 is approximately 20 inches. Floatation is achieved with approximately 1.25 cubic feet of foam (56 in FIG. 1). The ballast containers 52, 54 are, according to this embodiment, filled with sufficient ballast so that the water inlets of the skimmer remain about 1.5 inches below the water surface. The pump 32 is preferably a ½ HP sump pump (manufactured by Barnes Pumps, Inc., Mansfield, Ohio) modified to have a chopping or cutting and/or grinding impeller (FIGS. 15, 16) or a ½ HP sewage cutter pump model SC-50 manufactured by Stancor, Inc. Monroe, Conn. With either of these pumps and using a two inch flexible conduit, the filter apparatus may be located several hundred feet from the skimmer.

Figure 4:
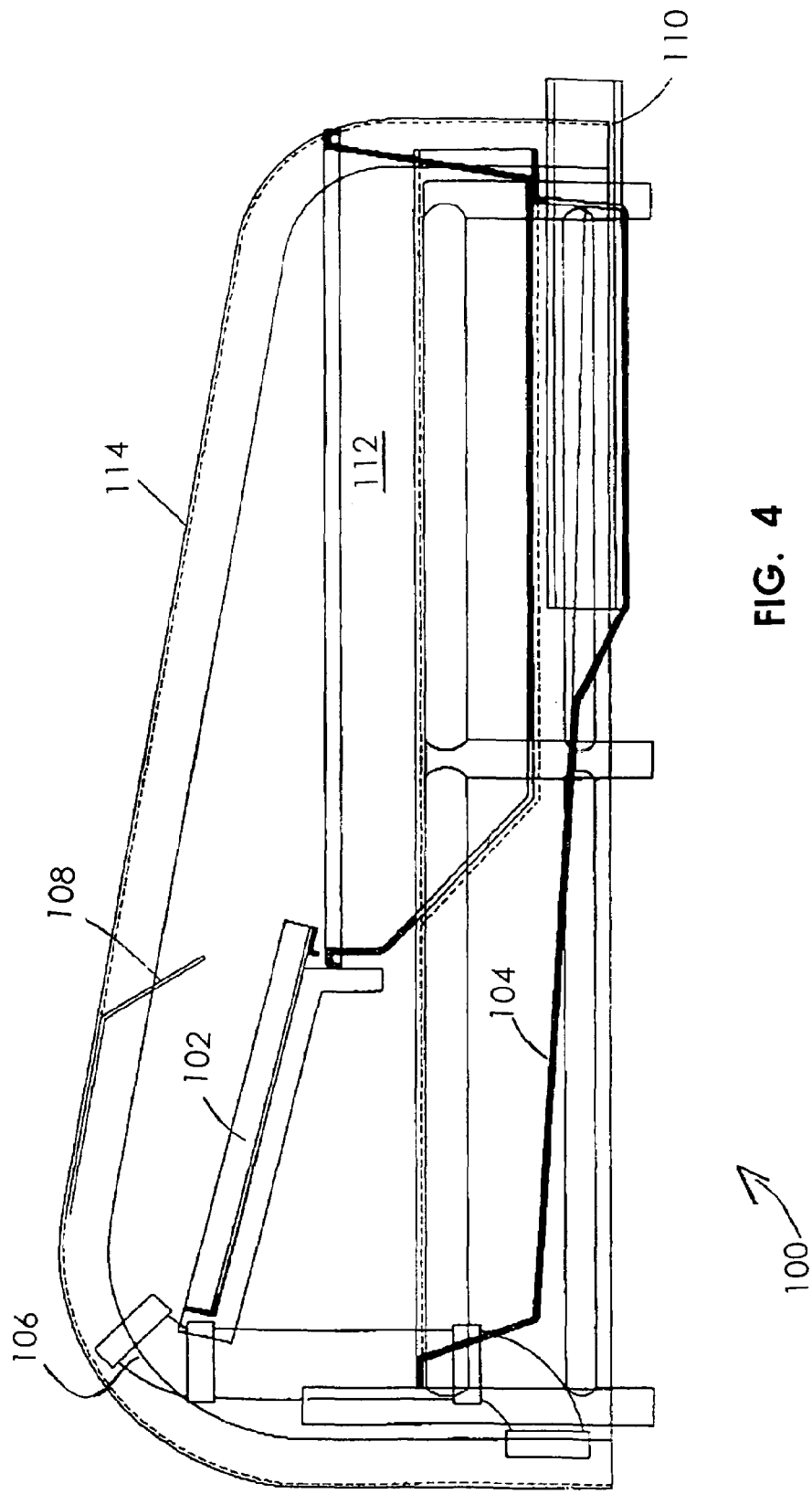
FIG. 4 is a partially transparent side elevation view of a filter apparatus according to the invention.

As mentioned above, the outlet 36 of the skimmer pump 32 is coupled by a flexible conduit 84 (shown partially in FIG. 2) to a remote filter apparatus 100 (FIG. 4). Turning now to FIG. 4, the filter apparatus 100 has an inclined screen 102 and a drain tray 104 disposed beneath the screen. The inlet 106 to the filter 100 is disposed above the screen 102. A deflector 108 is preferably provided above the screen 102 to deflect water through the screen 102. The drain tray 104 is provided with a water outlet 110 which is optionally coupled to an aerator before returning to the pond. According to one embodiment, a removable tray 112 is located at the lower end of the inclined screen 102 and the entire filter assembly 100 is provided with a hinged cover 114. According to another embodiment, the filter assembly is provided with a chute for emptying onto a compost heap.

The filter apparatus 100 is preferably made from a frame of PVC pipe and thermoformed ABS plastic members. The overall dimensions are approximately 46 inches long by approximately 20 inches wide by approximately 18 inches tall. The screen 102 is approximately twelve inches long and is inclined at approximately 14 degrees.

Figure 5:
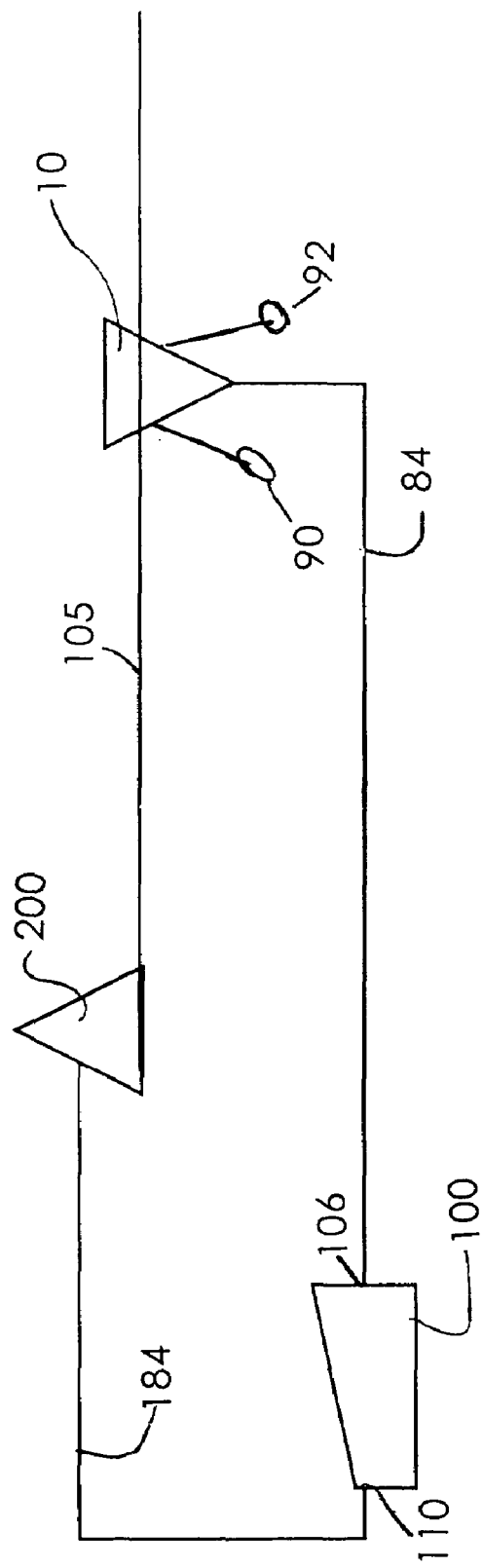
FIG. 5 is a schematic illustration of the system shown in a pond.

Referring now to schematic FIG. 5, according to the invention, the floating skimmer 10 is located in an appropriate location on the pond surface PS and anchored in place with anchors 90, 92. The remote filter apparatus 100 is also located in an appropriate location, and the skimmer is coupled to the filter apparatus with a flexible conduit 84. After the units are located, power is applied to the pump in the skimmer and water and solid debris are sucked into the vortex chamber of the skimmer. The solid debris is ground or chopped fine by the pump and the water and reduced solids mixture is pumped through the conduit to the filter apparatus. The reduced debris is separated from the water by the screen in the filter and is either deposited in the removable tray or allowed to fall onto a compost heap. The water from the filter is optionally aerated and returned to the pond. FIG. 5 illustrates an optional aerator 200 which is coupled by a conduit 184 to the water outlet 110 of the filter apparatus 100. As conditions change, e.g. wind changes, seasonal changes, the skimmer and/or the filter apparatus may be moved to a different location.

The appropriate location of the skimmer is typically close to the debris or where it is likely to catch the most debris. The appropriate location of the filter is governed primarily by the length of the conduit-connecting the skimmer and the filter. Aesthetic considerations may also be important in choosing the appropriate locations for the skimmer and the filter.

Figure 6:
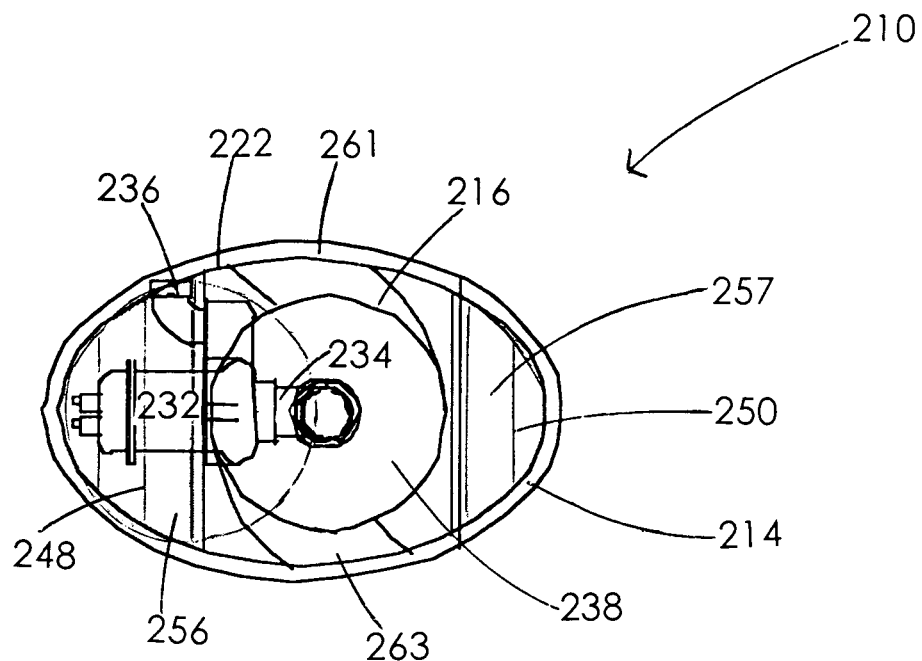
FIG. 6 is a transparent top view of a second embodiment of a skimmer according to the invention.
Figure 7:
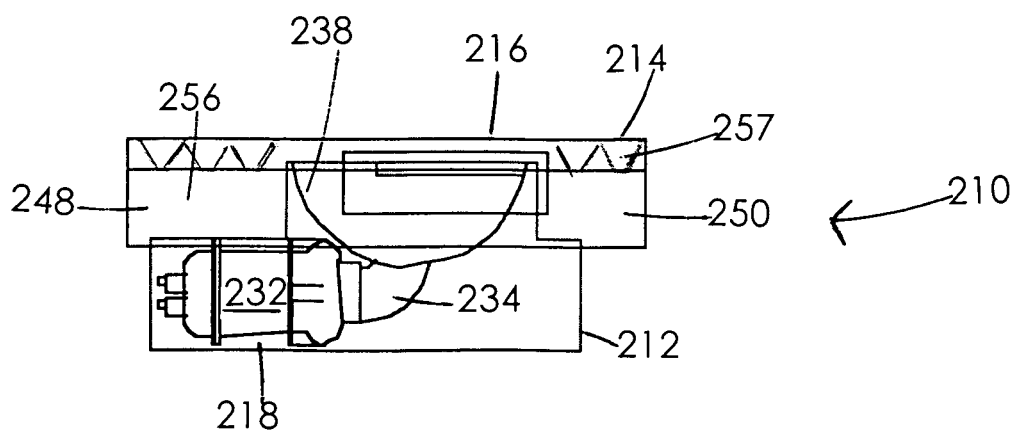
FIG. 7 is a transparent side view of the second embodiment of the skimmer according to the invention.

Turning now to FIGS. 6 and 7, a second embodiment of a skimmer 210 is illustrated schematically. The reference numerals in FIGS. 6 and 7 are similar to those in FIGS. 1–3, increased by 200, and refer to similar parts of the skimmer 210. As seen best in FIG. 6, the floatbody 214 is generally elliptical. In this embodiment, the vortex chamber 238 is hemispherical or nearly hemispherical. It is generally preferred that the vortex chamber be as close to hemispherical as possible and at least closer to hemispherical than elliptical. In any case, it is preferred that the vortex chamber be symmetrical about all three axes. In this embodiment, the pump 232 is mounted horizontally as in the first embodiment. The center of the vortex chamber is slightly off center of the floatbody. Floatation material 256, 257 is placed in the spaces 248, 250 on either side of the vortex chamber. As seen best in FIG. 7, the floatation material is less dense at the low end than at the upper end. The decrease in density at the lower end of the floatation is effected by forming ridges in the foam material.

Figure 8:
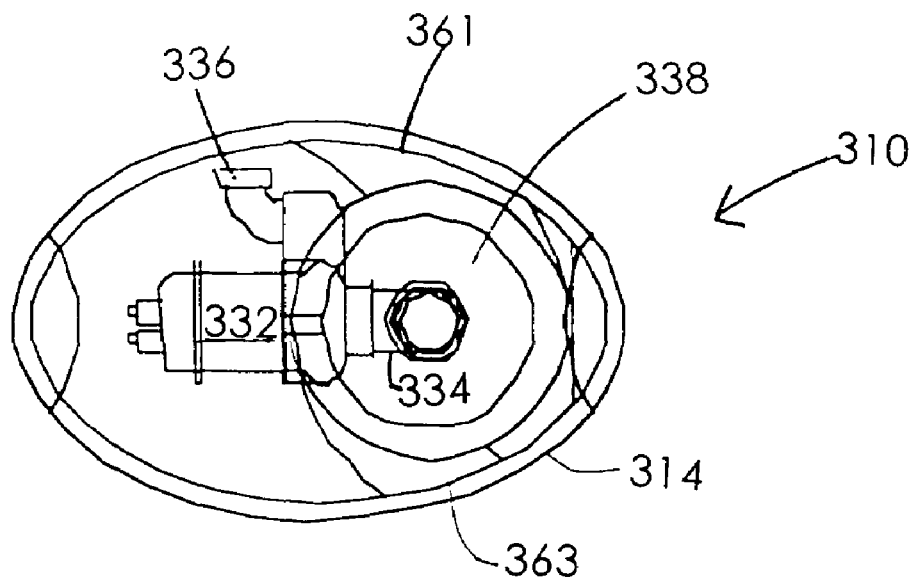
FIG. 8 is a transparent top view of a third embodiment of a skimmer according to the invention.
Figure 9:
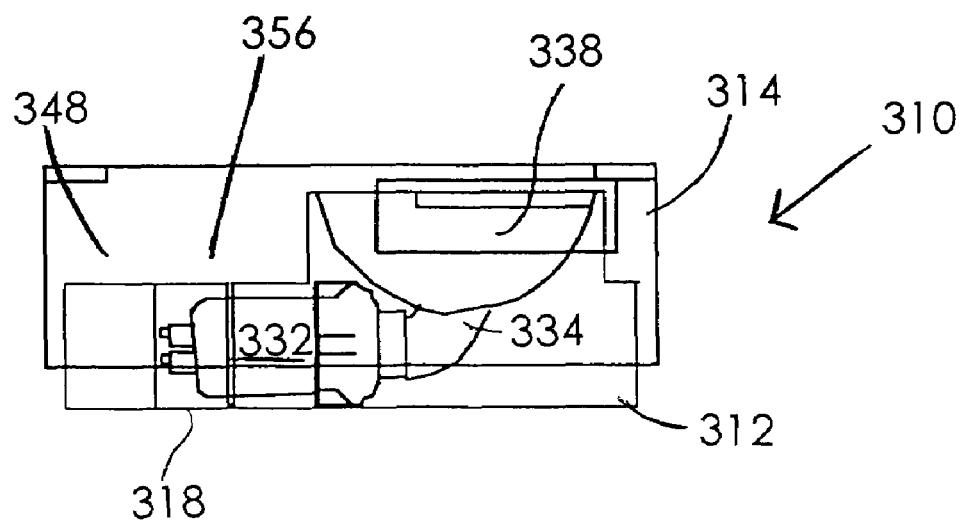
FIG. 9 is a transparent side view of the third embodiment of the skimmer according to the invention.

FIGS. 8 and 9 illustrate a third embodiment of a skimmer 310 according to the invention. In these Figures similar reference numerals (increased by 300) refer to similar parts as those in FIGS. 1–3. This embodiment differs from the second embodiment in that the vortex chamber 338 is located substantially to one side of the floatbody 314 and thus, all or substantially all of the floatation material 356 is located in the space 348 on one side of the vortex chamber.

Figure 10:
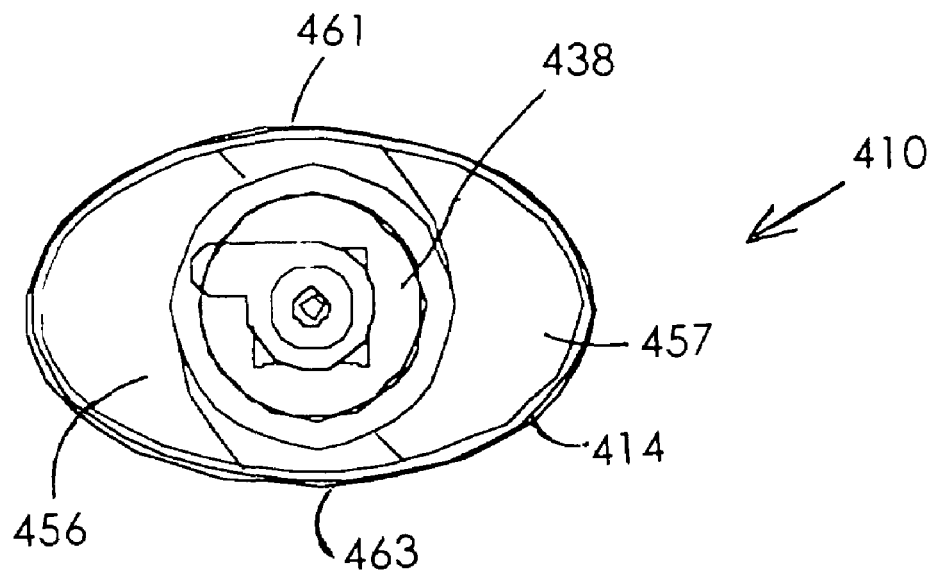
FIG. 10 is a transparent top view of a fourth embodiment of a skimmer according to the invention.
Figure 11:
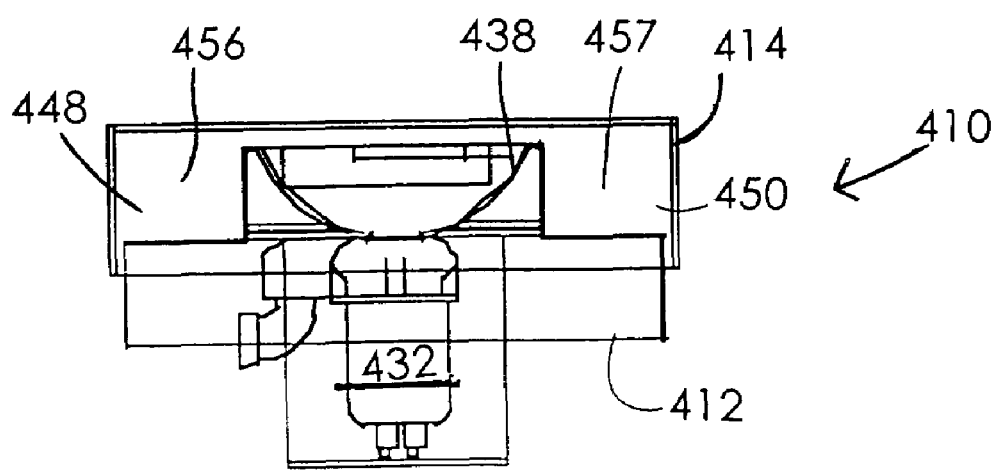
FIG. 11 is a transparent side view of the fourth embodiment of the skimmer according to the invention.

FIGS. 10 and 11 illustrate a fourth embodiment of a skimmer 410 according to the invention. The reference numerals in these Figures are similar to the reference numerals in FIGS. 1–3 (increased by 400 and refer to similar parts of the skimmer. In this embodiment, the vortex chamber 438 is centrally located relative to the floatbody 414 and the pump 432 is mounted vertically. Substantially equal amounts of floatation material 456, 457 are placed in the spaces 448, 450 on opposite sides of the vortex chamber 438.

Figure 12:
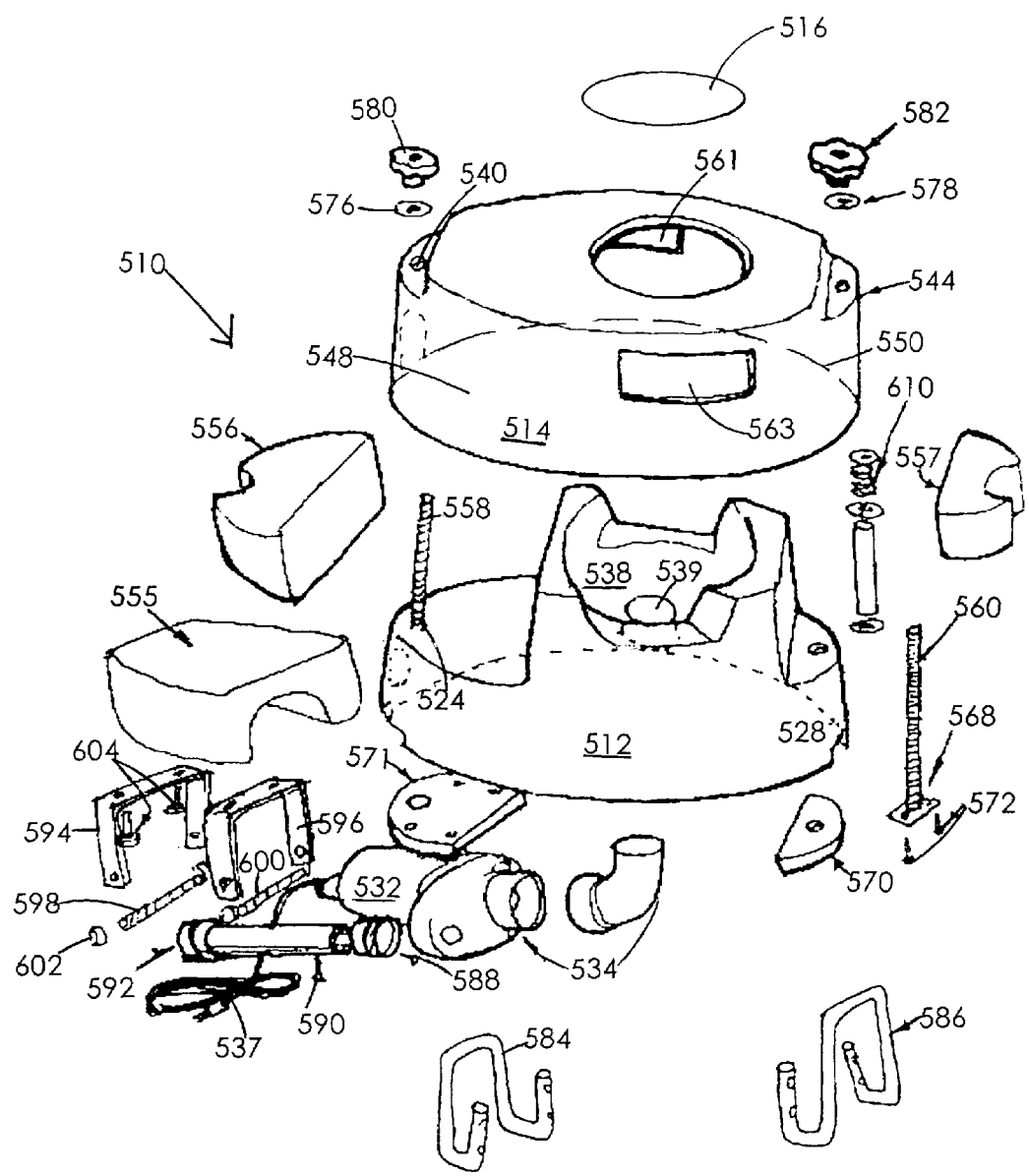
FIG. 12 is an exploded perspective view of a fifth embodiment of the skimmer
Figure 12A:
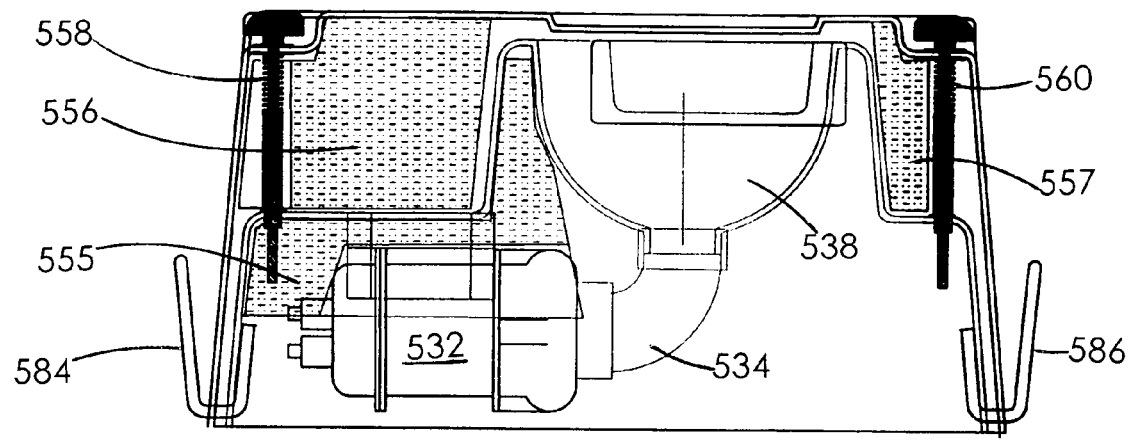
FIG. 12*a* is a transparent side elevational view of the skimmer of FIG. 12 assembled.

FIG. 12 illustrates the components of the fifth embodiment of the skimmer 510 and FIG. 12a illustrates those components assembled. This embodiment includes a lower pump housing 512, an upper housing cover 514, and a removable lid 516. The lower pump housing 512 is substantially elliptical and includes mounting holes 524, 528 at opposite ends of the housing 512. A pump 532 has an inlet 534 coupled to the drain 539 of a substantially hemispherical vortex chamber 538. The pump 532 has an outlet (not shown) and a waterproof electrical cord 537.

The upper housing cover 514 has mounting holes 540, 544 which align with the mounting holes 524, 528 in the lower pump housing 512 when assembled. The upper housing 514 provides spaces 548, 550 for floatation material 556, 557, preferably polyurethane foam, and has side openings 561, 563 which allow water and debris to enter the vortex chamber 538 when the upper and lower housing parts are assembled.

Threaded rods 558, 560 enter the mounting holes 524, 528, 540, 544 and are used to hold the upper and lower housings 514, 512 together with the floatation members 556, 557 in the spaces 548, 550. More particularly, the lower end of rod 560 is provided with a threaded anchor plate 568 which is coupled to a larger anchor plate by 570 by screws 572. A similar arrangement (not shown) exists between rod 558 and anchor plate 571. The upper ends of the rods 558, 560 are engaged by nut and washer assemblies 576, 578, 580, 582.

The floatation material and the threaded rod assemblies are arranged so that the water inlet of the skimmer remains approximately 1.5 inches below the water surface.

The skimmer 510 is also preferably provided with handles 584, 586 which allow the skimmer to be easily lifted out of the water and placed into the water.

The outlet (not shown) of the pump 532 is coupled via a two inch male adapter 588 to a length of ABS pipe 590 which is coupled via a two inch female adapter to a hose (not shown). Two U-brackets brackets 594, 596 are used to secure the pump 532 to the anchor plate 571. The open ends of the U-brackets are closed by rods 598, 600 and nuts, e.g. 602, with the pump then secured in the brackets. The upper closed ends of the brackets are secured to the plate 571 with screws, e.g. 604.

According to the illustrated embodiment each rod 558, 560 is covered with a coaxial spring assembly, e.g. 610, which acts as a shock absorber. The spring assembly includes three washers, a PVC spacer and a spring all placed over a threaded rod. According to the illustrated embodiment, from top to bottom, the arrangement is washer, spring, washer, spacer, and washer.

As seen best in FIG. 12a, the unit has a main pump housing and vortex chamber portion, which has slight negative (but weight balanced) buoyancy and a cover/floatation/suspension portion which provides overall positive buoyancy and is adjustable for different skimming depths. Notable features of this arrangement are:

a) The main portion contains foam 555 around the pump 532, which is offset from the center, designed to allow the main portion to be slightly negatively buoyant but even—that is, not overly heavy on either side.

b) The cover portion has foam 556, 557 for floatation but also for suspension. This foam is fixed to the "ceiling" or top of the cover, and may use either a solid or a triangular finger configuration, with the fingers pointing downward. A significant amount of the foam is designed to be above water level, so that if a bird lands on the unit its weight will not submerge the unit. In operation, the main portion is suspended from the cover unit, held in place by the threaded rods, and its depth adjusted by the threaded knobs.

c) The two portions are joined by the threaded rods with coaxial springs, washers and spacers. The springs operate during start up to stabilize the unit. After the unit has been placed in the water and has filled with water, it may be powered up. At that time, the pump will immediately pull a large amount of water from the vortex chamber, making the main portion more buoyant. As the main portion begins to rise up in the water, the springs compress and lift the top unit further out of the water, thereby reducing overall system buoyancy. As more water rushes into the vortex chamber, the system settles and stabilizes.

d) Use of the springs, spacers and threaded rods allows variation of the skimming depth for different applications (for example, small particle skimming would be done at a very shallow depth, skimming ponds with walnuts in them would be done at a greater depth). The skimming depth is adjusted by rotating the threaded knobs to tighten or loosen the spring, or by substituting different springs or spacers in the suspension before installation.

Figure 18A:
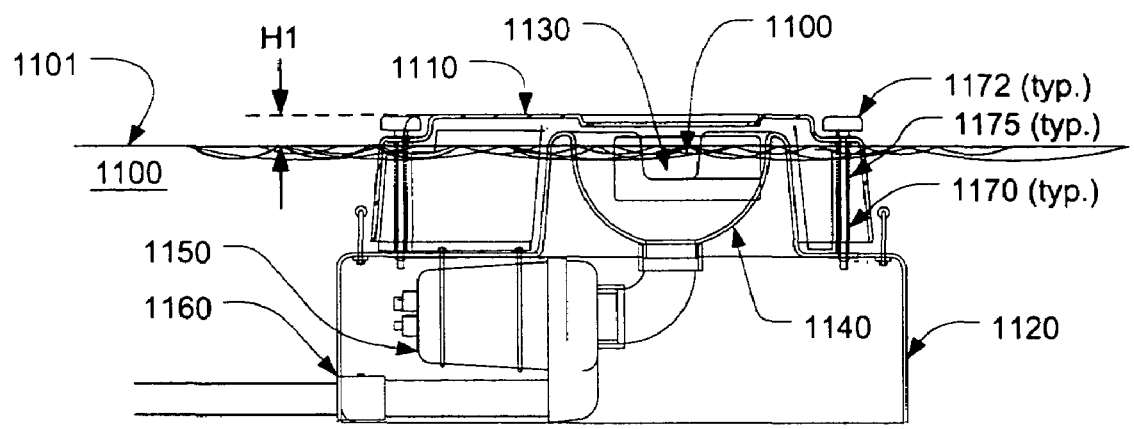
FIGS. 18*a*–18*c* illustrate the operation of the spring suspension when the skimmer is powered up.
Figure 18B:
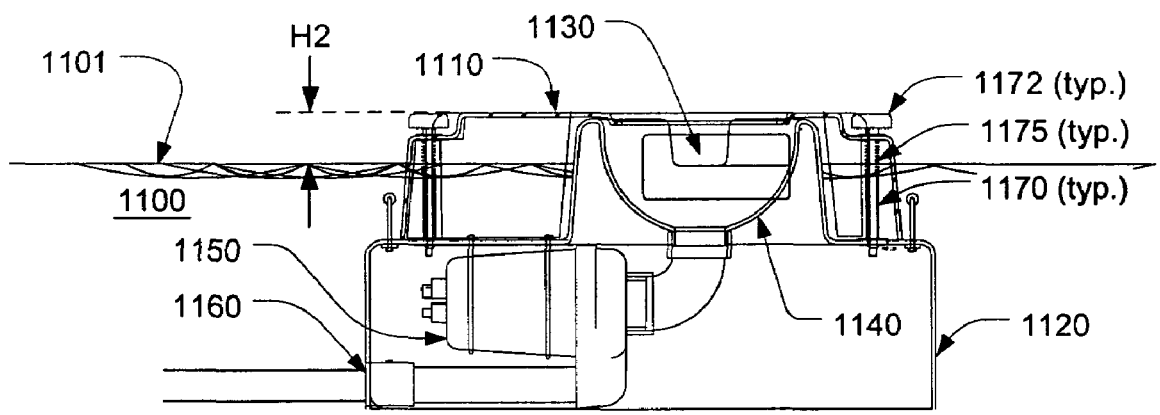
Figure 18C:
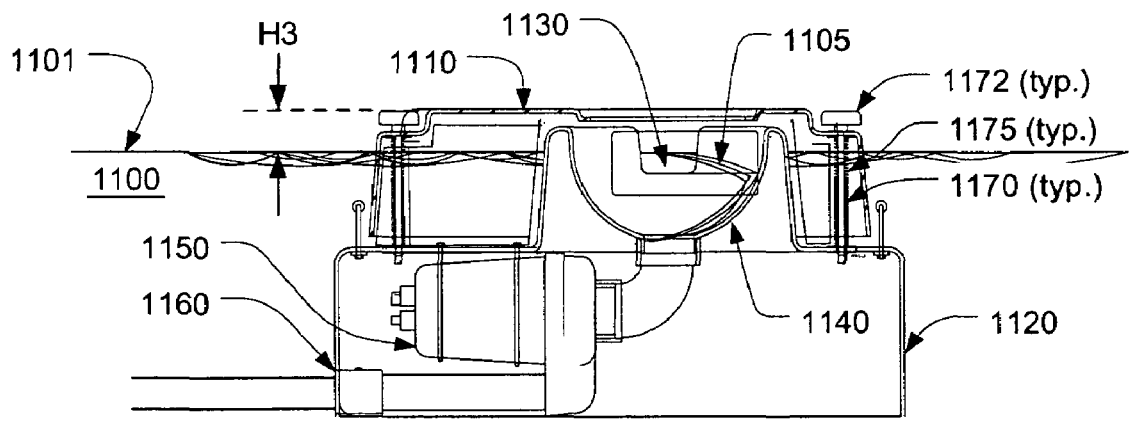

FIGS. 18a, 18b, and 18c clarify the operation of the suspension and the interaction between the floating upper portion and the lower portion after the skimmer is placed in the water (FIG. 18a), during start-up (FIG. 18b), and during normal steady-state operation (FIG. 18c).

FIG. 18a shows the skimmer after it has been placed in a body of water 1100, but before the pump 1150 has been turned on. The floating upper portion 1110 provides buoyancy to keep the skimmer afloat. The lower portion 1120 is suspended from the floating upper portion 1110 by threaded rods 1170. Preferably, the lower portion 1120 is negatively buoyant when it is filled with water so that it hangs down from the floating upper portion 1110, suspended by the threaded rods 1170.

The lower portion 1120 includes a vortex chamber 1140 that is connected to a pump 1150 via a suitable conduit. The lower portion 1120 also includes one or more water inlets 1130 and a water outlet 1160. Once the skimmer is placed in the water 1100, water 1100 will enter via the water inlets 1130 and fill up the vortex chamber 1140. In the illustrated embodiment, the top of the floating upper portion 1110 floats at a height Hi above the surface 1101 of the water 1100 during this state.

When the pump 1150 is turned on, the pump sucks most of the water out of the vortex chamber 1140 and directs it out of the skimmer via the water outlet 1160. As the water leaves, air rushes into the vortex chamber 1140. As a result, the buoyancy of the lower portion 1120 increases, and the lower portion 1120 rises upwards. As the lower portion 1120 rises upwards, it presses up on the lower end of the springs 1175. The springs 1175, in turn, exert an upward force on the floating upper portion 1110. This lifts the floating upper portion 1110 to the position shown in FIG. 18b, where the top of the upper portion 1110 is momentarily at a height H2 (H2>H1) above the surface 1101. As the skimmer rises, the springs 1175 will also compress, absorbing some of the energy.

Eventually, the springs 1175 decompress and push the lower portion 1120 away from the floating upper portion 1110. The skimmer settles down in the water 1100 to a position where the water level 1101 is higher than the lower lip of the water inlets 1130, as seen in FIG. 18c. The springs 1175 operate to stabilize the skimmer by damping the up and down motion of the lower portion 1120 during start up, thereby reducing the shock to the system. This prevents the skimmer from popping in and out of the water, or at least reduces such popping. In this state, the top of the floating upper portion 1110 is at a height H3 (H2>H3>H1) above the surface 1101, and water 1100 pours into the vortex chamber 1140 through the water inlets 1130. The lower portion 1120 may be negatively buoyant in this state so that it hangs down from the floating upper portion 1110, suspended by the threaded rods 1170. Alternatively, the lower portion 1120 could be slightly positively buoyant in this state so that it presses up lightly against the springs 1175.

Due to the shape of the vortex chamber, the position of the water inlet 1130 and the operation of the pump 1150, a water vortex 1105 forms in the vortex chamber, and the inpouring water is pumped by the pump 1150 out through the water outlet 1160. Forming a vortex is advantageous because it draws floating debris into the pump 1150 and out through the water outlet 1160. The skimmer may be operated in this state indefinitely (i.e. for the operational lifetime of the pump) as long as power is applied. Water 1100 will continue to flow in via the water inlets 1130, form a vortex 1105 in the vortex chamber 1140 and be pumped out of the water outlet 1160 by the pump 1150.

During the steady-state operation, the lower lip of the water inlets 1130 is below the surface 1101 of the water. The depths of the lower lip of the water inlets 1130 below the surface 1101 can be adjusted by turning the threaded knobs 1172 so as to raise or lower the lower portion 1120 with respect to the floating upper portion 1110, so as to provide the skimming depth desired by the user (depending on, for example, the type of debris that is being skimmed). For a sample skimmer, the heights H1, H2, and H3 shown in FIGS. 18a, 18b, and 18c were measured as 2.0 inches, 3.28 inches, and 2.75 inches, respectively.

Figure 13:
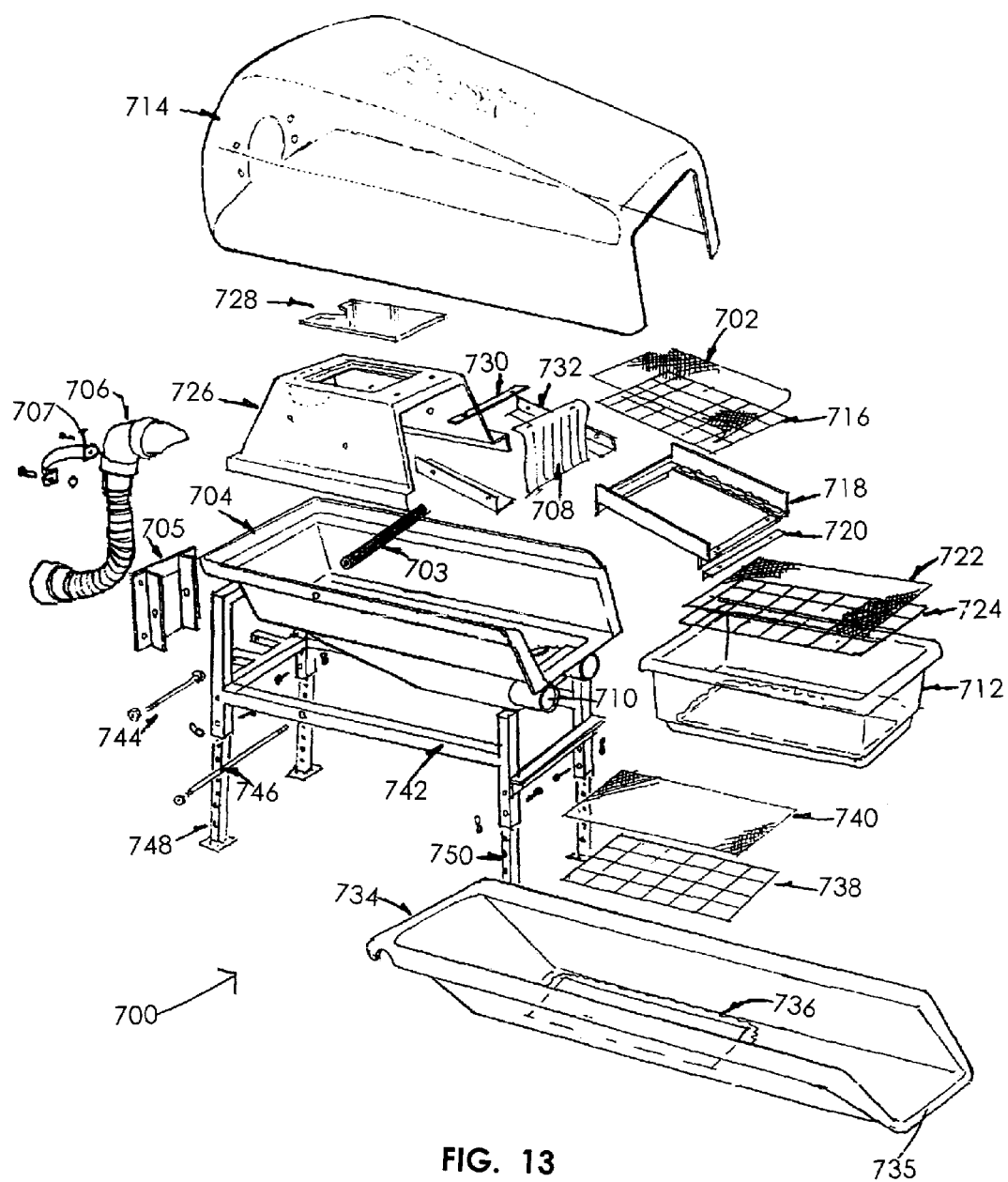
FIG. 13 is an exploded perspective view of a second embodiment of the filter apparatus.

FIG. 13 illustrates the second embodiment of filter apparatus 700. Like the filter apparatus 100 shown in FIG. 4, the apparatus 700 includes an inclined screen 702 and a drain tray 704. The inlet 706 is disposed above the screen 702 and a flexible skirt deflector 708 is provided downstream above the screen 702. The drain tray 704 is provided with a pair of water outlets 710 and a removable tray 712 is located at the lower end of the inclined screen. A removable cover 714 is provided over substantially all of the assembly.

The inclined screen 702 is preferably a stainless steel mesh supported by a stainless steel rod support 716 in an aluminum frame 718, 720. Screens of different mesh size may be provided for different applications. For example, 1,000 micron mesh (normal window screen material) may be suitable for some applications, such as those often treated with a "lake rake". Five hundred micron mesh may be more suitable for duck weed and the like. One hundred eighty micron is probably most suitable for watermeal.

The drain tray 704 is provided with a rubber cross stop 703 for stability.

The outlet 706 is coupled by an aluminum collar 707 to a pivot hinge 705. The pivot hinge 705 is coupled to the cover 714 and to a tube frame 742 by a pivot bolt 744.

The flexible skirt 708 is coupled to a plastic screen housing 726 having an upper LEXAN window 728 via an aluminum screen frame 730, 732. The window 728 allows inspection of the screen 702 and the skirt 708 helps direct the water through the screen 702.

The removable tray 712 has a bottom stainless steel screen 722 supported by a stainless steel rod support mesh 724.

Figure 13A:
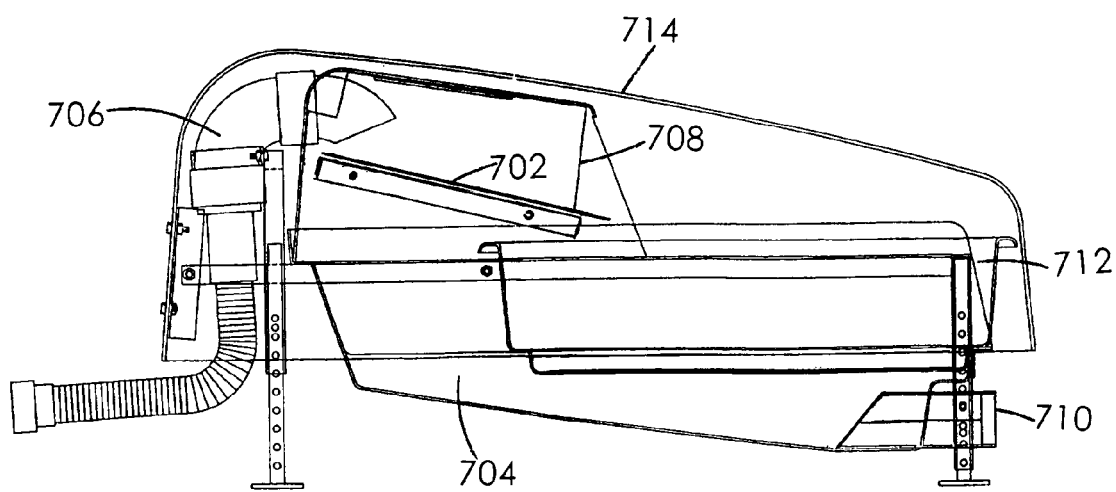
FIG. 13*a* is a transparent side elevational view of the filter of FIG. 13 assembled with the removable tray.
Figure 13B:
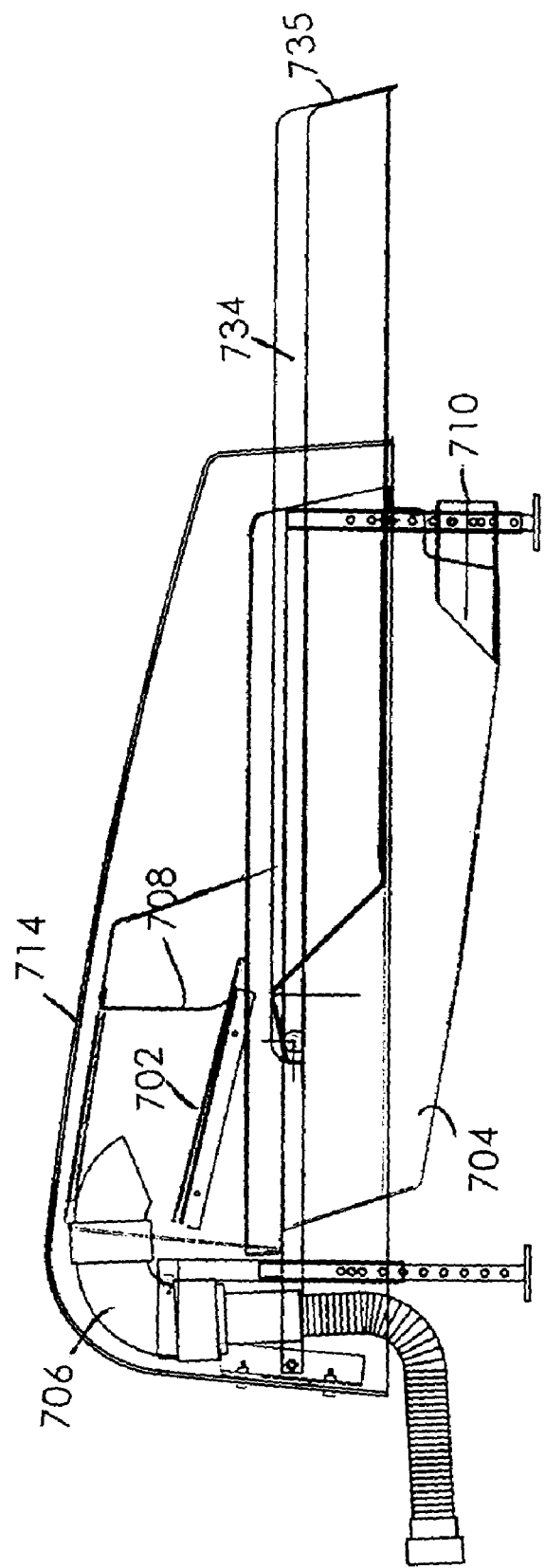
FIG. 13*b* is a transparent side elevational view of the filter of FIG. 13 assembled with the removable chute.

According to the embodiment shown in FIGS. 13, 13a, and 13b, the filter apparatus 700 includes a removable chute 734 which can be placed in the drain tray 704 in place of the removable tray 712. The chute 734 is provided with a bottom opening 736 covered by a screen support mesh 738 and a stainless steel screen 740. It will be appreciated that both the removable tray 712 and the chute 734 allow water to pass through their bottoms into the drain tray 704. The removable tray 712 collects filtered debris which may then be carried to another location. The chute 734 allows debris to exit its open end 735 into a compost heap, for example.

The filter apparatus 700 is preferably built on an aluminum tube frame 742 which is provided with extension legs 748, 750 which are locked in place by, e.g. cross bolts such as cross bolt 746. This allows the overall height of the apparatus to be adjusted. It also allows the unit to be located on uneven ground. These legs and the chute allow the unit to be positioned to dump solid waste into a wheelbarrow or garden cart.

FIG. 14 illustrates the configuration for the inlets to the vortex chamber 238. In particular, one wall (802, 806) of each inlet is nearly straight and the other wall (804, 808) is curved. In this embodiment, no "combs" (61, 63 in FIG. 1) are used.

FIGS. 15 and 16 illustrate a chopping or cutting and/or grinding impeller which can be used in any of the embodiments. The impeller has a substantially circular base 902 with a central mounting hole 904 and two upstanding curved walls 906, 908. The walls spiral inward toward the mounting hole and terminate with sharp edges. As seen in FIGS. 15 and 16, the sharp edges include teeth and taper from bottom to top. It will be appreciated that other means for reducing solids could be provided. For example, grinding or chopping blades could be provided separate from the pump impeller.

Figure 17:
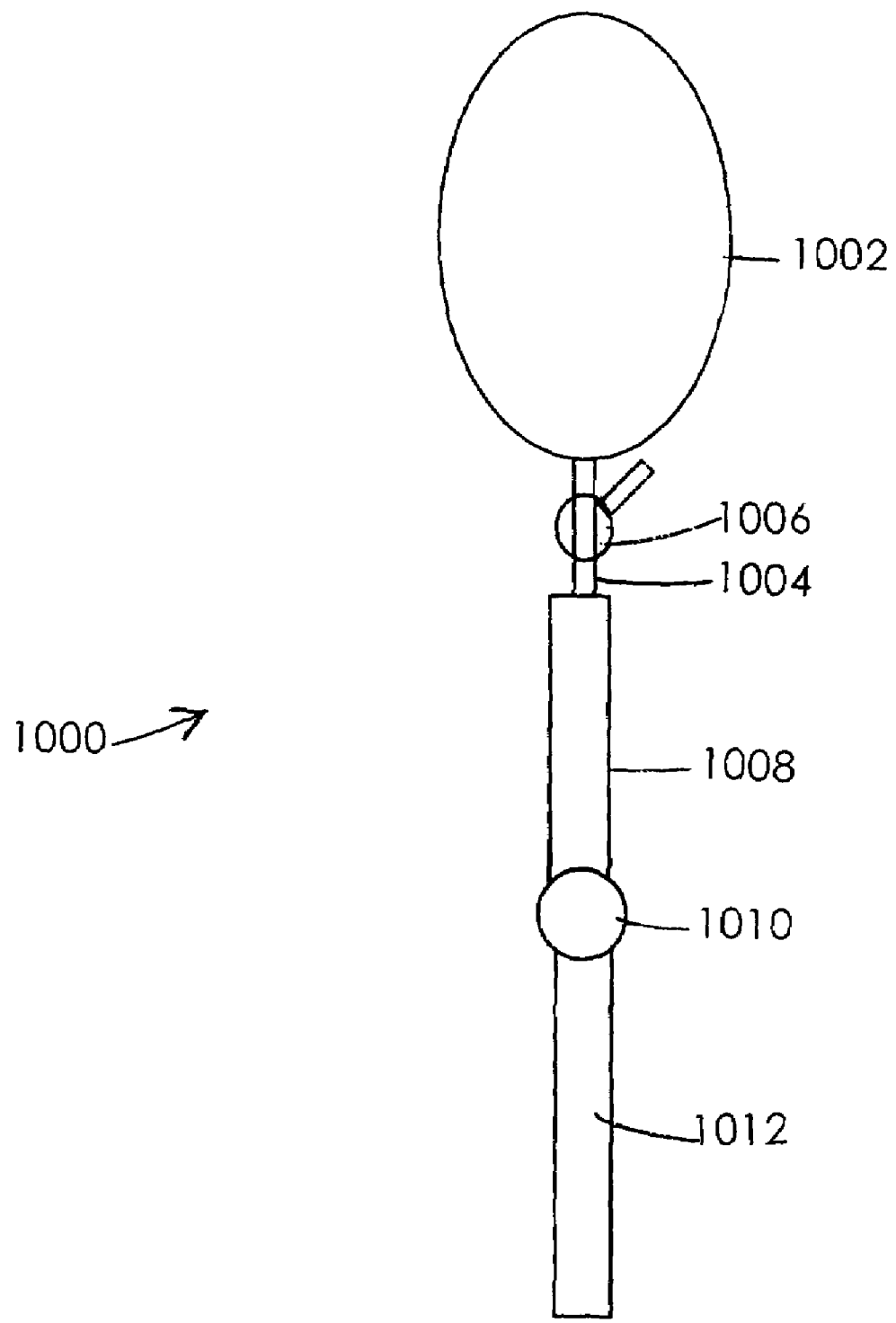
FIG. 17 is a schematic view of a skimmer system equipped with an oscillating travel feature.

FIG. 17 is a schematic illustration of a skimmer head having an oscillating jet which causes it to "sweep". This arrangement 1000 includes a skimmer head 1002 according to the invention. The pump outlet of the skimmer head 1002 is coupled to a short T connector 1004, one outlet of which supplies an oscillating sprinkler head 1006. A filter screen (not shown) may be placed between the T connector and the sprinkler head. The other outlet of the T connector is coupled to a first conduit 1008. The first conduit 1008 is coupled to a second conduit 1012 via an anchor point 1010. In operation, the oscillating sprinkler head causes the skimmer head to sweep back and forth in an arc about the anchor point 1010. More particularly, some of the water pumped from the skimmer 1002 is directed through the filter screen (not shown) to the sprinkler head 1006 while the remainder of the water and entrained reduced debris is directed through the conduits 1008, 1012. The water which is directed to the sprinkler head causes the sprinkler head to oscillate back and forth, e.g. through an arc of 180° or so. The water exiting the sprinkler head exerts a lateral force on the T connector which causes the skimmer, sprinkler head, and the T connector to all move in the direction opposite to the direction of the water flowing from the sprinkler head. As the sprinkler head oscillates, the direction changes, thus causing the skimmer to sweep back and forth in an arc. It will also be appreciated that the water exiting the sprinkler head is aerated and returned to the pond.

The embodiments described above provide one or more of the following advantages:

systems for removing solid waste from the surface of a pond or similar watercourse;

a system for removing solid waste from the surface of a watercourse whereby collected solid waste is very easily removed from the system;

a system for removing solid waste from the surface of a watercourse whereby the system is essentially self-cleaning;

a system for removing solid waste from the surface of a watercourse which is easily movable from one location to another in the pond;

a system for removing solid waste from the surface of a watercourse which can be used in cooperation with an aeration device;

a system for removing solid waste from the surface of a watercourse which automatically adjusts for wide variation in the water level;

a system for removing solid waste from the surface of a watercourse wherein the solid waste is reduced to prevent clogging; and a movable solid waste filter which is adjustable to reside on uneven surfaces.

There have been described and illustrated herein methods and apparatus for removing floating solid waste from the surface of a pond. While particular embodiments of the invention have been described, it is not intended that the invention be limited thereto, as it is intended that the invention be as broad in scope as the art will allow and that the specification be read likewise. Thus, while particular materials were described, it will be appreciated that the apparatus of the invention can be implemented utilizing different materials. Also, while particular sizes were described with respect to the pond skimmer and filter, it will be appreciated that both the pond skimmer and filter may be implemented in different sizes. Further, while particular hardware was described, it will be appreciated that different hardware could be utilized with respect to the pond skimmer and filter. It will therefore be appreciated by those skilled in the art that yet other modifications could be made to the provided invention without deviating from its spirit and scope as so claimed.

What is claimed is:

1. A system for removing solid waste from the surface of a pond, comprising: a) a floating pond skimmer having a skimmer inlet, a skimmer outlet, and a pump configured to draw water and solid waste from said skimmer inlet and direct the water and solid waste to said skimmer outlet; b) a remote filter apparatus having a filter inlet and a water outlet; and c) a conduit coupled to said skimmer outlet and said filter inlet, wherein said floating pond skimmer sucks a mixture of solids and water and pumps the mixture through the conduit to the filter apparatus which separates the solids from the mixture, wherein said pump has an impeller which reduces solids sucked by said pump.

2. A system according to claim 1, wherein: said floating pond skimmer has a vortex chamber coupled to said skimmer inlet.

3. A system according to claim 2, wherein: said vortex chamber is substantially hemispherical.

4. A system according to claim 2, wherein: said floating pond skimmer has a removable lid, and said remote filter apparatus has an inclined screen which separates the solids from the mixture.

5. A system according to claim 4, wherein: said filter apparatus has a removable solid waste tray and a hinged cover.

6. A system according to claim 5, wherein: said vortex chamber is hemispherical, and said skimmer has at least one shock absorbing element.

7. A system according to claim 1, wherein: said floating pond skimmer has an adjustable ballast.

8. A system according to claim 1, wherein: said floating pond skimmer has means for coupling to an anchor.

9. A system according to claim 1, wherein: said floating pond skimmer has a removable lid.

10. A system according to claim 1, wherein: said remote filter apparatus has an inclined screen which separates the solids from the mixture.

11. A system according to claim 1, wherein: said filter apparatus has a removable solid waste tray.

12. A system according to claim 1, wherein: said filter apparatus has a hinged cover.

13. A system according to claim 1, wherein: said filter apparatus includes a chute for directing the solids to a deposit location.

14. A system according to claim 1, wherein: said skimmer has at least one shock absorbing element.

15. A system according to claim 1, wherein: said skimmer has a pair of opposed handles.

16. A pond skimmer for removing solid waste from the surface of a pond, comprising: a) a floating skimmer body having an inlet and an outlet; and b) an on-board pump arranged to direct water from said inlet to said outlet, wherein
said pump has an impeller with teeth for grinding or chopping solids sucked by said pump.

17. A skimmer according to claim 16, further comprising: c) a vortex chamber between said inlet and said outlet.

18. A skimmer according to claim 16, further comprising: c) a conduit coupled to said pump for delivering water and debris to a remote location.

19. A skimmer according to claim 16, further comprising: c) an adjustable ballast.

20. A skimmer according to claim 16, further comprising: c) means for coupling to an anchor.

21. A pond skimmer for removing solid waste from the surface of a pond, comprising: a) a skimmer body having an inlet and an outlet, a float and a ballast container; and b) an on-board pump arranged to direct water from said inlet to said outlet; c) a vortex chamber between said inlet and said pump; and d) a removable lid covering said vortex chamber and said ballast container, allowing access to said vortex chamber for cleaning.

22. A skimmer according to claim 21, wherein: said vortex chamber is substantially hemispherical.

23. A pond skimmer for removing solid waste from the surface of a pond, comprising: a) an upper skimmer housing cover having an inlet; b) a lower pump housing; c) an on-board pump arranged in said lower pump housing; and d) at least one shock absorbing element coupled to said upper skimmer housing cover and said lower pump housing and stabilizing the skimmer by damping up and down motion of the skimmer when the pump is started.

24. A skimmer according to claim 23, further comprising: e) a pair of opposed handles.

25. A pond skimmer for removing solid waste from the surface of a pond, comprising: a) a floating skimmer body having an inlet and an outlet; and b) an on-board pump arranged to direct water from said inlet to said outlet; and c) a water jet nozzle for propelling the skimmer across the surface of the water, wherein: said water jet nozzle is an oscillating water jet nozzle which rotates back and forth.

26. A skimmer according to claim 25, further comprising: d) a conduit coupled to said pump for delivering water and debris to a remote location.

27. A skimmer according to claim 25, wherein: said pump has an impeller which reduces solids sucked by said pump.

28. A skimmer according to claim 27, wherein: said vortex chamber is substantially hemispherical.

29. A skimmer according to claim 28, further comprising: e) a removable lid.

* * * * *